(12) United States Patent
Meller (10) Patent No.: US 9,141,975 B2
(45) Date of Patent: Sep. 22, 2015

(54) INFERRING USER RISK PROFILE FROM TRAVEL PATTERNS

(71) Applicant: Intel Corporation, Santa Clara, CA (US)

(72) Inventor: Eran Meller, Moshav Mishmeret (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/016,104

(22) Filed: Sep. 1, 2013

(65) Prior Publication Data

US 2014/0089101 A1 Mar. 27, 2014

Related U.S. Application Data

(60) Provisional application No. 61/704,498, filed on Sep. 23, 2012.

(51) Int. Cl.
  *G06Q 30/00* (2012.01)
  *G06Q 30/02* (2012.01)
  *G06Q 40/08* (2012.01)

(52) U.S. Cl.
  CPC ............ *G06Q 30/0269* (2013.01); *G06Q 40/08* (2013.01)

(58) Field of Classification Search
  CPC ..................................................... G06Q 40/08
  USPC ........................................................ 705/14.1
  See application file for complete search history.

(56) References Cited

U.S. PATENT DOCUMENTS

| | | | |
|---|---|---|---|
| 4,571,684 A | 2/1986 | Takanabe et al. |
| 5,689,717 A | 11/1997 | Pritt |
| 5,724,072 A | 3/1998 | Freeman et al. |
| 5,988,853 A | 11/1999 | Kim et al. |
| 6,038,559 A | 3/2000 | Ashby et al. |
| 6,107,944 A | 8/2000 | Behr et al. |
| 6,188,955 B1 | 2/2001 | Robinson et al. |
| 6,233,518 B1 | 5/2001 | Lee |
| 6,236,357 B1 | 5/2001 | Corwith |
| 6,278,939 B1 | 8/2001 | Robare et al. |
| 6,282,489 B1 | 8/2001 | Bellesfield et al. |
| 6,314,369 B1 | 11/2001 | Ito et al. |
| 6,320,518 B2 | 11/2001 | Saeki |

(Continued)

FOREIGN PATENT DOCUMENTS

DE 19651146 A1 6/1998
DE 10029198 A1 12/2001

(Continued)

OTHER PUBLICATIONS

International Patent Application # PCT/IB2013/052016 Search Report dated Jul. 28, 2013.

(Continued)

*Primary Examiner* — Daniel Lastra
(74) *Attorney, Agent, or Firm* — Trop, Pruner & Hu, P.C.

(57) ABSTRACT

A method for estimating a risk profile of a user of a personal digital assistant (PDA) includes collecting, using the PDA, data indicative of a travel pattern of the user of the PDA. The risk profile of the user of the PDA is inferred from the travel pattern. The risk profile to is output an external system, so as to enable the external system to provide to the user a commercial offer based on a risk level which is indicated by the risk profile.

21 Claims, 3 Drawing Sheets

(56) References Cited

U.S. PATENT DOCUMENTS

| | | |
|---|---|---|
| 6,321,161 B1 | 11/2001 | Herbst et al. |
| 6,347,278 B2 | 2/2002 | Ito |
| 6,381,535 B1 | 4/2002 | Durocher et al. |
| 6,462,676 B1 | 10/2002 | Koizumi |
| 6,493,630 B2 | 12/2002 | Ruiz et al. |
| 6,526,284 B1 | 2/2003 | Sharp et al. |
| 6,565,610 B1 | 5/2003 | Wang et al. |
| 6,643,650 B1 | 11/2003 | Slaughter et al. |
| 6,678,535 B1 | 1/2004 | Narayanaswami |
| 6,747,649 B1 | 6/2004 | Sanz-Pastor et al. |
| 6,826,385 B2 | 11/2004 | Kujala |
| 6,834,195 B2 | 12/2004 | Brandenberg et al. |
| 6,854,115 B1 | 2/2005 | Traversat et al. |
| 6,898,516 B2 | 5/2005 | Pechatnikov et al. |
| 6,917,878 B2 | 7/2005 | Pechatnikov et al. |
| 6,931,429 B2 | 8/2005 | Gouge et al. |
| 6,934,755 B1 | 8/2005 | Saulpaugh et al. |
| 6,941,221 B2 | 9/2005 | Draeger et al. |
| 6,970,869 B1 | 11/2005 | Slaughter et al. |
| 7,089,110 B2 | 8/2006 | Pechatnikov et al. |
| 7,117,266 B2 | 10/2006 | Fishman et al. |
| 7,142,205 B2 | 11/2006 | Chithambaram et al. |
| 7,251,561 B2 | 7/2007 | Dotan |
| 7,266,450 B2 | 9/2007 | Glaza |
| 7,599,792 B1 | 10/2009 | Smith |
| 8,180,655 B1 | 5/2012 | Hopkins |
| 2001/0001847 A1 | 5/2001 | Hessing |
| 2002/0111146 A1 | 8/2002 | Fridman et al. |
| 2003/0117297 A1 | 6/2003 | Obradovich et al. |
| 2004/0058652 A1 | 3/2004 | McGregor et al. |
| 2005/0021876 A1 | 1/2005 | Asai et al. |
| 2005/0251324 A1 | 11/2005 | Wiener et al. |
| 2006/0155465 A1 | 7/2006 | Jung et al. |
| 2006/0184321 A1 | 8/2006 | Kawakami et al. |
| 2006/0235615 A1 | 10/2006 | Kato et al. |
| 2007/0067104 A1 | 3/2007 | Mays |
| 2007/0198184 A1 | 8/2007 | Yoshioka et al. |
| 2007/0294024 A1 | 12/2007 | Sasaki |
| 2008/0091348 A1 | 4/2008 | Choi |
| 2008/0248815 A1 | 10/2008 | Busch |
| 2009/0125229 A1 | 5/2009 | Peri et al. |
| 2009/0240429 A1 | 9/2009 | Tanaka et al. |
| 2010/0030586 A1 | 2/2010 | Taylor et al. |
| 2010/0131304 A1 | 5/2010 | Collopy et al. |
| 2011/0106429 A1 | 5/2011 | Poppen et al. |
| 2011/0161100 A1 | 6/2011 | Peak et al. |
| 2011/0161119 A1* | 6/2011 | Collins ............................ 705/4 |

FOREIGN PATENT DOCUMENTS

| | | |
|---|---|---|
| EP | 0875878 A2 | 11/1998 |
| EP | 1118837 A2 | 7/2001 |
| EP | 1186863 A2 | 3/2002 |
| EP | 2487659 A1 | 8/2012 |
| WO | 0101370 A1 | 4/2001 |
| WO | 0127812 A2 | 4/2001 |
| WO | 2010125499 A1 | 11/2010 |
| WO | 2011057217 A1 | 5/2011 |
| WO | 2013144759 A1 | 10/2013 |

OTHER PUBLICATIONS

International Patent Application # PCT/IB2013/058202 Search Report dated Dec. 30, 2013.

Peri et al., International Patent Application # PCT/US13/66477 filed Oct. 24, 2013.

Lardinois, F., "Siri: Your Personal Assistant for the Mobile Web", 6 pages, Feb. 4, 2010.

Introduction—Scalable Vector Graphics 1.0, pp. 1-7, Sep. 4, 2001.

ESRI White Paper Series, "Automation of Map Generalization", The Cutting-Edge Technology, Environmental Systems Research Institute, Incorporation, pp. 1-7, May 1996.

International Patent Application # PCT/IB2008/01445 Search Report dated Feb. 3, 2009.

Beckmann et al, "The R*-tree: an efficient and robust access method for points and rectangles", Proceedings of ACM SIGMOD International Conference on Management of Data, pp. 322-331, 1990.

Cherkassky et al, "Shortest Path Algorithms: Theory and Experimental Evaluation", Technical Report, Department of Computer Science, Stanford University, pp. 93-1480, 1993.

\* cited by examiner

INFERRING USER RISK PROFILE FROM TRAVEL PATTERNS

CROSS-REFERENCE TO RELATED APPLICATIONS

This application claims the benefit of U.S. Provisional Patent Application 61/704,498, filed Sep. 23, 2012, whose disclosure is incorporated herein by reference.

FIELD OF THE INVENTION

The present invention relates generally to analyzing the behavior of PDA users, and particularly to methods and systems for evaluating risk profiles of travelling PDA users.

BACKGROUND OF THE INVENTION

Certain corporates, such as insurance companies, banks and credit card issuers, are interested in distinguishing among their clients on the basis of a risk profile attributed to each client. For example, a client whose risk profile indicates that he is a cautious driver poses a lower risk to the insurance company than a wild driver, and would therefore be entitled to lower premium fees.

SUMMARY OF THE INVENTION

An embodiment of the present invention provides a method for estimating a risk profile of a user of a personal digital assistant (PDA), including collecting, using the PDA, data indicative of a travel pattern of the user of the PDA. The risk profile of the user of the PDA is inferred from the travel pattern. The risk profile is output to an external system, so as to enable the external system to provide to the user a commercial offer based on a risk level which is indicated by the risk profile.

In some embodiments, inferring the risk profile includes estimating a probability of the user of the PDA to be involved in an insurance event, and the commercial offer includes an insurance premium offer that is based on the estimated probability. In other embodiments, inferring the risk profile includes evaluating risk-related preferences of the user of the PDA, and inferring the risk profile includes determining the risk profile based on the risk-related preferences. In yet other embodiments, the travel pattern includes a mode of transportation the user of the PDA employs, and inferring the risk profile includes determining the risk profile based on the mode of transportation.

In an embodiment, the travel pattern includes driving hours of the user of the PDA, and inferring the risk profile includes determining the risk profile based on the driving hours. In another embodiment, the travel pattern includes a driving speed of the user of the PDA while driving a route, and inferring the risk profile includes comparing the driving speed of the user to a reference speed of the route. In yet another embodiment, the method includes determining the reference speed by performing a comparison between the travel pattern of the user and travel patterns of other users.

In some embodiments, inferring the risk profile includes detecting a deviation from the travel pattern. In other embodiments, inferring the risk profile includes assessing a state-of-mind of the user based on the travel pattern. In yet other embodiments, the method further includes receiving the commercial offer from the external system, and providing the commercial offer to the user via the PDA.

There is additionally provided, in accordance with an embodiment of the present invention, apparatus including a user interface, one or more sensors, and at least one processor. The processor is configured to collect from the one or more sensors data which is indicative of a travel pattern of a user of a PDA, to infer, based on the travel pattern, a risk profile of the user of the PDA, and to output the risk profile to an external system, so as to enable the external system to provide to the user a commercial offer based on a risk level which is indicated by the risk profile.

There is additionally provided, in accordance with an embodiment of the present invention, a computer software product, including a non-transitory computer-readable medium in which program instructions are stored, which instructions, when read by at least one processor, cause the at least one processor to collect from one or more sensors data which is indicative of a travel pattern of a user of a PDA which includes a user interface, to infer based on the travel pattern a risk profile of the user of the PDA, and to output the risk profile to an external system so as to enable the external system to provide to the user a commercial offer based on a risk level which is indicated by the risk profile.

The present invention will be more fully understood from the following detailed description of the embodiments thereof, taken together with the drawings in which:

DETAILED DESCRIPTION OF EMBODIMENTS

Overview

People in modern societies are often engaged with commercial corporates or companies that may offer them various types of services and goods. In some cases, fees offered for a particular service may depend on a risk level, which the client poses to the company. For example, an insurance company may offer insurance fees to a client based on the probability of the client to be involved in an insurance event. A risk level that a certain person (i.e., client) may pose to an insurance (or other) company is closely related to the daily and long-term traveling activity of the person.

While traveling, many people carry and use Personal digital assistants (PDAs), such as smart phones, which help them plan and keep track of their schedules. PDAs are typically equipped with location and motion sensors, which can acquire traveling-related information from daily activities held by PDA users (or just users). In the description that follows and in the claims, risk-related aspects of the behavior of a PDA user (e.g., behavior aspects that are related to traveling activity) are collectively referred to as a risk profile attributed to the PDA user.

Embodiments of the present invention that are described herein provide systems and methods for inferring a risk profile of a PDA user by analyzing traveling information gathered on that user.

The terms "assistant" and "PDA," as used herein, refer to a portable computing device with suitable interfaces and software for carrying out the functions described herein. This assistant continually constructs and updates a data structure representing the user's cognitive and contextual state, which reflects both the user's needs, preferences, and time constraints and the user's physical location and environment, including situational and dynamic elements. The assistant may collect state information and analyze it using a learning algorithm for the purpose of identifying behavioral trends and patterns relating to the user's motion and mobility activity. In the description that follows and in the claims, the term "travel pattern" refers to state information that is derived by analyzing motion-related behavioral trends.

In some embodiments, a risk profile comprises static elements such as user gender, age, car model and color, or any other static information that is known about the user beforehand, and may affect the risk level the user poses to the insurance or car-rental company. The risk profile additionally comprises dynamic elements, which are derived from analyzing traveling activities of the user. Such dynamic elements include, for example, driving speed compared to limit or other traffic speed, and driving hours (e.g., whether early or late, short or long). As another example, the potential of a car theft event is a risk factor that may depend on places where the user regularly visits or parks his car.

In some embodiments, the assistant also uses the user's state, as well as personal, social and local feeds, sensor information, and other forms of available data, in order to calculate and determine the user's "state-of-mind." Aspects of this state-of-mind may include, for example, the user's level of openness and interest as opposed to stress and distress. The assistant then uses this state-of-mind information in making decisions and recommendations to the user, including deciding whether or not to recommend anything at all at a given time, as well as what to recommend or offer. Additionally, certain aspects of the user's state-of-mind may indicate, at least temporarily, an increased or decreased risk to be involved in an insurance event.

In some embodiments, a corporate uses the risk profile of a PDA user to offer the user better focused purchase recommendations. For example, by deducing from the risk profile that the user is a wild driver (e.g., the user habitually drives above the speed limit), the corporate may choose to offer the user extreme sport products. In an example embodiment, travel and purchase patterns of a PDA user are correlated to respective patterns of other users in order to derive suitable commercial offers for the user in question.

The functions of the personal digital assistant that are described in this patent application may typically be implemented in software on existing portable devices, such as smart phones, portable computers, and other types of digital assistants that are known in the art. The disclosed embodiments typically take advantage of sensors (such as a GPS receiver and/or accelerometer), communication and user interfaces, and computing capabilities that are built into such devices.

System Description

Figure 1:
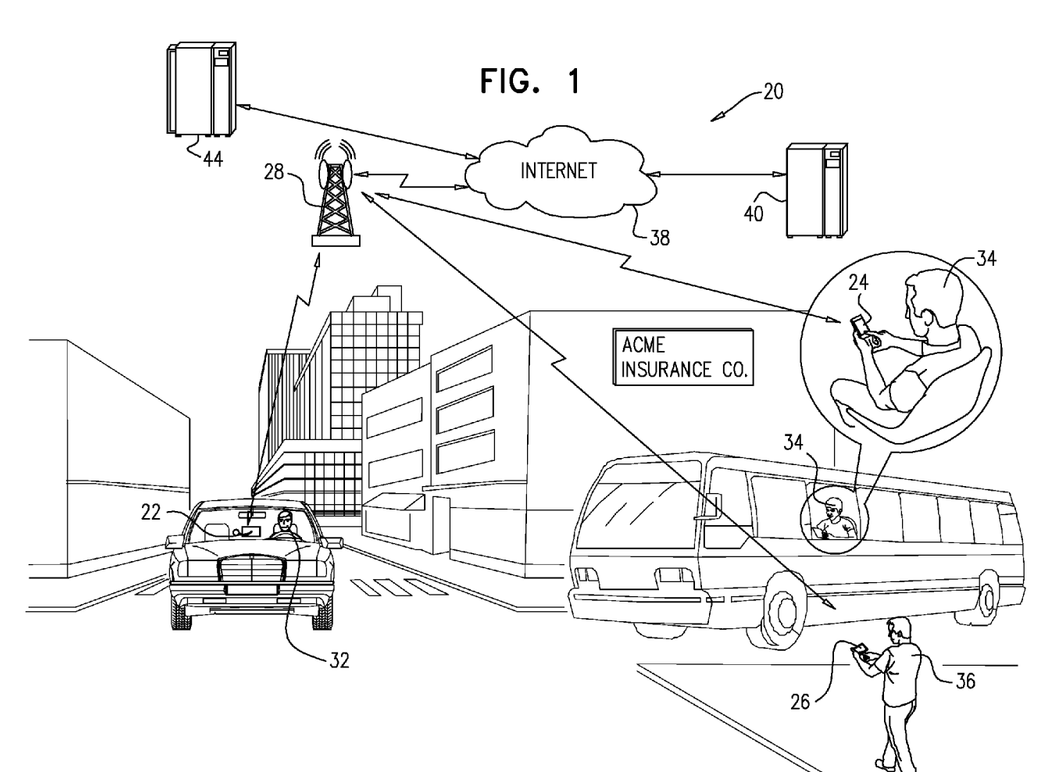
FIG. 1 is a pictorial illustration of a system for evaluating risk-related behavior of traveling PDA users, in accordance with an embodiment of the present invention.

FIG. 1 is a pictorial illustration of a system 20 for evaluating risk-related behavior of personal digital assistant (PDA) users (or just users), in accordance with an embodiment of the present invention. In embodiments described below, system 20 maintains for each of the PDA users a user state in which traveling habits and routines of the PDA user are organized in travel patterns. Risk-related behavioral factors of the user are inferred from analyzing the travel patterns of the user in question, possibly jointly with travel patterns of other users.

Various aspects related to systems and methods for producing and analyzing user state and travel patterns are described, for example, in PCT Application PCT/IB2013/052016, filed Mar. 14, 2013, which is assigned to the assignee of the present patent application and whose disclosure is incorporated herein by reference.

In FIG. 1, users 32, 34, 36 carry respective PDAs 22, 24, 26. (The description that follows relates specifically, for convenience and clarity, to user 32 and PDA 22, but may equally apply to the other users and PDAs.) PDAs 22, 24, 26 communicate via a wireless network 28, such as a cellular network or wireless LAN. These communication links enable the PDAs to access a server 40 via a data network 38, such as the Internet. The PDAs may comprise smart phones or any other suitable type of mobile computing device having a suitable user interface, communication interface, and location-finding capabilities (such as GPS). PDAs such as 22, 24, and 26 send raw and processed location-based information to server 40. Using the information received from the PDAs, server 40 is able to track travel patterns of individual users, and infer user-specific risk profiles from these travel patterns. In some embodiments, the travel patterns and/or the risk profiles are produced by the PDAs and/or jointly by the PDAs and server 40.

Additionally, server 40 provides various sorts of location-based information, such as maps, weather, available retail establishments, services and special offers, transportation and traffic, and locations of members of the user's social network. This information is typically provided by suitable feeds from other servers (generally shown in FIG. 2 as external sources and feeds).

Based on information that PDA 22 receives from and about user 32 and on information received from server 40 and possibly other PDAs 24, 26, PDA 22 builds a schematic map, which may be viewed by the user on the PDA display. This map collates location-based information to identify and locate potential targets within a given radius of the user. The radius may be defined in terms of space and/or time, i.e., time needed to reach a given target, which will typically vary depending on the user's mode of transport and local conditions (such as congestion and availability of transport).

A "target" may be a desired object, such as a meeting the user is supposed to attend, a commercial establishment, or a point of interest; or it may be an item to avoid, such as a traffic jam or a person to whom the user is known to be hostile. Based on the map and the user's state and intent as identified by PDA 22, the PDA makes recommendations to the user relating to effective utilization of motion, time and space. Some of the recommendations PDA 22 presents to the user such as route directions, may be derived from the user's travel patterns (and other state elements), and possibly pushed to the PDA from server 40.

Based on travel patterns derived in each user's PDA and/or in server 40, the server can infer a risk profile that is attributed to the user. The risk profile may include risk-related factors such as driving speed, driving hours, mode of transportation, visited places, and/or the probability of the user to be involved in an insurance event, such as injury, car damage, and/or car theft.

Server 40 communicates via network 38 with a server of a commercial corporate, or with another external system of that corporate. The commercial corporate may be, for example, an insurance company, a car rental company, a bank, a credit card company, or any other corporate that provides services and/or goods that are at least partially based on evaluated risk profiles of the PDA users. Server 40 sends to server 44 inferred risk profiles of PDA users, and potentially provides to the users respective commercial offers based on each user's risk profile.

For example, when server 44 assess from the risk profile of a particular user that the user is a careful driver, server 44 (or more generally, the corporate operating server 44) may offer to that user a car or life insurance contract with reduced premium, or any other suitable benefits. In alternative embodiments, server 40 sends to server 44 travel patterns (instead of evaluated risk profiles) and server 44 infers from the patterns respective risk profiles of the PDA users.

Figure 2:
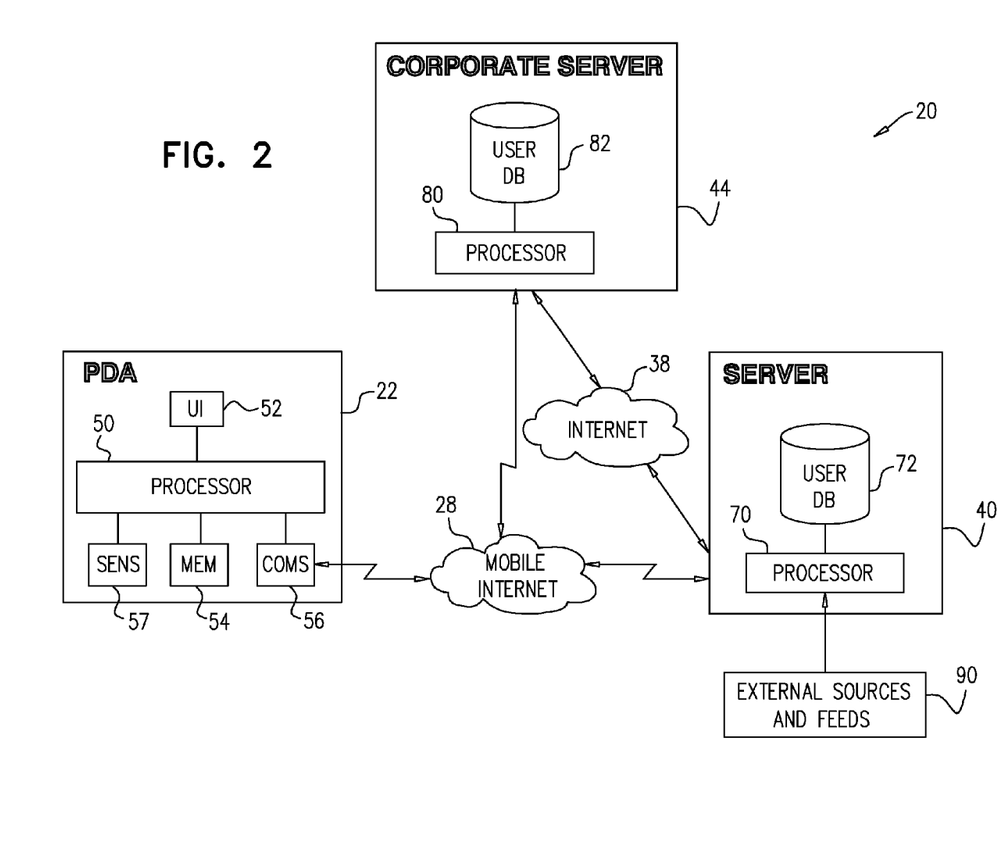
FIG. 2 is a block diagram that schematically illustrates functional elements of a system for evaluating risk-related behavior of traveling PDA users, in accordance with an embodiment of the present invention.

FIG. 2 is a block diagram that schematically illustrates functional elements of system 20, including PDA 22, server 40 and server 44, in accordance with an embodiment of the present invention. In the configuration of FIG. 2, PDA 22 communicates with servers and 44 via mobile internet 28, and server 40 communicates with server 44 via data network 38. In terms of hardware components, PDA 22 typically comprises a processor 50, with a suitable user interface (UI) 52, memory 54, communication interfaces 56, and sensors 57 (such as position and motion sensors), as are known in the art. User interface 52 comprises a display screen, user controls (possibly including a touch screen interface), and audio input and output devices.

Each of the servers 40 and 44 is typically a general-purpose computer, comprising a respective processor 70 or 80 with a respective memory 72 or 82 and suitable interfaces, as is known in the art. Processors 50, 70, and 80 typically run under the control of software program instructions. The applicable software may be downloaded to PDA 22, server 40, and server 44 in electronic form, over a network, for example. Alternatively or additionally, the software may be stored on tangible, non-transitory computer-readable media, such as optical, magnetic, or electronic memory. Processors 50, 70, and 80, may comprise any suitable sort of computational hardware that is known in the art, and may optionally be supplemented by dedicated or programmable hardware, as well as peripheral components, for carrying out at least some of the functions that are described herein.

In terms of software components in PDA 22, a personal information manager (PIM, not shown) may be based on standard PIM software provided with most PDAs, and maintains the user's calendar, contact lists, messaging, tasks and so forth. Processor 50 tracks the user's location, as provided by sensors 57 and other inputs, and may also maintain related information, such as direction and speed of travel. Processor 50 combines PIM and location information with inputs from other sources, including UI 52 and server 40, in order to compute and update the state of user 32, as explained further hereinbelow.

Server 40 maintains a user database in memory 72, containing information gathered from PDAs 22, 24, 26, . . . , regarding user location-based information, schedules, states and preference. Based on information provided by user PDAs and other sources such as social network links, server 40 may derive and store information regarding the daily routines, locations, travel patterns, preferences and personal history of the users, and updates this information in real time as user states change. Server 40 may additionally connect to external sources and feeds 90 that provide, for example, traffic or weather information as well as commercial advertisements and/or purchase offers to be pushed to the PDAs.

Similarly to server 40, server 44 maintains a user database in memory 82. At least some of the users whose travel-related information is maintained in database 72, are also engaged with the commercial corporate that manages server 44. Server 44 maintains in database 82 user information as required by the commercial corporate, and in particular receives from server 40 risk profiles of PDA users, to be stored in database 82. Thus, the corporate operating server 44 is able to provide commercial offers to PDA users based on their respective risk profile.

Additionally or alternatively, the above types of state and travel-related user information may be derived, processed and stored by the user PDAs, either autonomously or in coordination with server 40. More generally, functions attributed in FIG. 2 and in the description above to server 40, server 44, or PDA 22 may be carried out by each of these components separately or jointly in any suitable combination. In particular, assuming PDAs 22, 24, 26, . . . , have sufficient communication and computing resources, it may be preferable for at least some of the functions attributed above to server 40 (or server 44) to be implemented within and among the PDAs themselves. Thus, although the arrangement of software components described above has been found to be useful and effective in implementing the functionality that is described herein, other arrangements will be apparent to those skilled in the art and are considered to be within the scope of the present invention.

Inferring User Risk Profile from Travel Patterns

The "targets" of relevance to user 32 at any given time and in any given place will vary depending on the cognitive and contextual state of the user. This state may be represented by a vector of values, which PDA 22 computes, maintains, and updates continually. Typically, for reasons of privacy, the user state vector may be held in the memory of the PDA, and only those fields that the user is prepared to share are passed to servers or published on the network. Fields of the state vector that may relate to travel patterns include, for example, mode of transportation, travel routes and speed, driving hours and the like. Other state fields include, for example, user preferences and state-of-mind. PDA 22 learns the daily and weekly schedule and routine of user 32 by analyzing actual user activities. A detailed method for state vector construction is described in PCT Application PCT/IB2013/052016, cited above.

Examples of risk related inferences that may be made from travel patterns, as measured by the PDA and/or server 40, are described below. A flow chart of a related method is described in FIG. 3 further below.

Server 40 analyzes travel patterns of user 32 to infer a risk profile of the user. Risk profiles may be used by a corporate such as an insurance company or a car rental company to provide users with differential premium fees (or other benefits or penalties) based on risk levels indicated by the risk profiles. A risk profile may comprise static information that can be derived, for example, from an engagement contract singed between the user and the commercial corporate. Examples of such static user information include gender, age, car model and color, and insurance history. Other risk profile elements are automatically and dynamically inferred from travel patterns and other state components that are derived from the user activities and include, for example, driving habits, places the user visits, state-of-mind, and services and goods the user consumes.

Cellular telephone operators and providers of mobile navigation and location-based services typically receive frequent position readings (such as GPS coordinates) from many PDAs in the same area. In this manner, providers are able, for example, to collect traffic information by computing the speeds of motion of multiple PDAs that are moving in the same direction along the same geographical strip that is known to be a road.

In some embodiments, server 40 compares the motion and speed pattern of a given PDA (e.g., PDA 22) to the pattern of the traffic in the same vicinity in order to extract information about the user of the PDA (e.g., user 32). For example, if a given user continues moving forward while the surrounding traffic is stopped (possibly in a queue for a traffic light or a traffic jam), the server may conclude that the user is travelling using a vehicle whose vehicle type is, for example, a motor-cycle or a bicycle, depending on speed. The term "vehicle type" refers to any transport means including car, train or foot (a walking user).

As another example, on an open road, server 40 may compare the speed of the user to a reference speed such as the speed limit in that road and/or the average speed of the prevalent traffic. This sort of comparative analysis can assist server 40 and the user's PDA in inferring the user's current and long-term state—risk-inclined or cautious, relaxed or under pressure—and thus inferring respective elements of the risk profile of the user.

Additionally or alternatively, server 40 and/or PDA (e.g., PDA 22) may collect information over time about the user's driving habits or travel habits and draw inferences about the user from this information. For example, a user who regularly makes long trips on workdays can be identified as a professional driver whose risk to be involved in a car accident is higher than the same risk attributed to the average non-professional driver. A user who travels a certain route at the same hours on most or all workdays can be identified as a commuter, and the routes he travels (e.g., free or busy) may be used to infer the risk of a car accident event. The hours of travel (early or late, long work day or short) can also be significant. The PDA may use the days and times of such habitual travel to distinguish between work and recreational travel (such as frequent driving to an exercise location for an hour in early morning or to a leisure activity in the evening) and may build a profile of likely user preferences on this basis.

Deviations from the user's normal travel pattern can also be used in inferring the user's current state. For example, if the PDA finds that the user is lagging behind his normal commuting schedule or that the user is driving significantly faster than his habitual speed, the PDA may infer that the user is under time pressure, and therefore (at least temporarily) in increased risk of accidents. Moreover, users who often plan tight schedules are generally at higher risk to be involved in insurance events.

Server 40 and/or PDA 22 may derive more complex inferences about user's 32 state, travel patterns, and preferences from details of driving patterns. As noted earlier, the user's speed, as well as patterns of acceleration and deceleration, may be used in inferring state-of-mind and risk profile. As another example, a user who spends many minutes circling the streets in a particular urban area before finally parking may be particularly cost-conscious and insensitive to wasted time, while another user who immediately enters a pay parking lot may be considered to have the opposite priorities. Moreover, parking in different areas in the city may potentially present different risk of the car to be stolen.

The evaluated risk profile of a user may be also affected by the user's preferences and vice versa. For example, if the user's preferences indicate that the user frequently purchases extreme sport products, server 40 can conclude that the user is a risk-taker by nature. Similarly, if the user's risk profile indicates that the user is a fast driver, server 44 may conclude that the user is a risk-taking typecast person and provide the user with an offer to purchase a suitable product or service such as a ski vacation.

As another option, server 40 may correlate driving patterns with purchasing patterns over large numbers of users in order to decide what content and suggestions to push to each user. Thus, for example, if the user's driving pattern falls in a cluster of users who have tended to purchase a certain type of goods or services, the server may push electronic coupons to the user promoting such goods or services. For instance, users who habitually drive faster than the speed limit may be found to be particularly receptive to promotions for high-risk investment instruments or adventure sports. The server will choose to push such coupons at a time when the user's state—which may, again, be based on driving pattern, as well as known scheduling and location constraints—indicates that the user is likely to be receptive to the suggested purchase, rather than annoyed by intrusive promotional content.

The information inferred from travel patterns, and in particular risk profile elements, as described above, may be combined with other indicators of user state, needs, and preferences, such as those described in the above-mentioned PCT Application PCT/IB2013/052016, in order to optimize the information and support as well as risk-related offers provided to each user.

Figure 3:
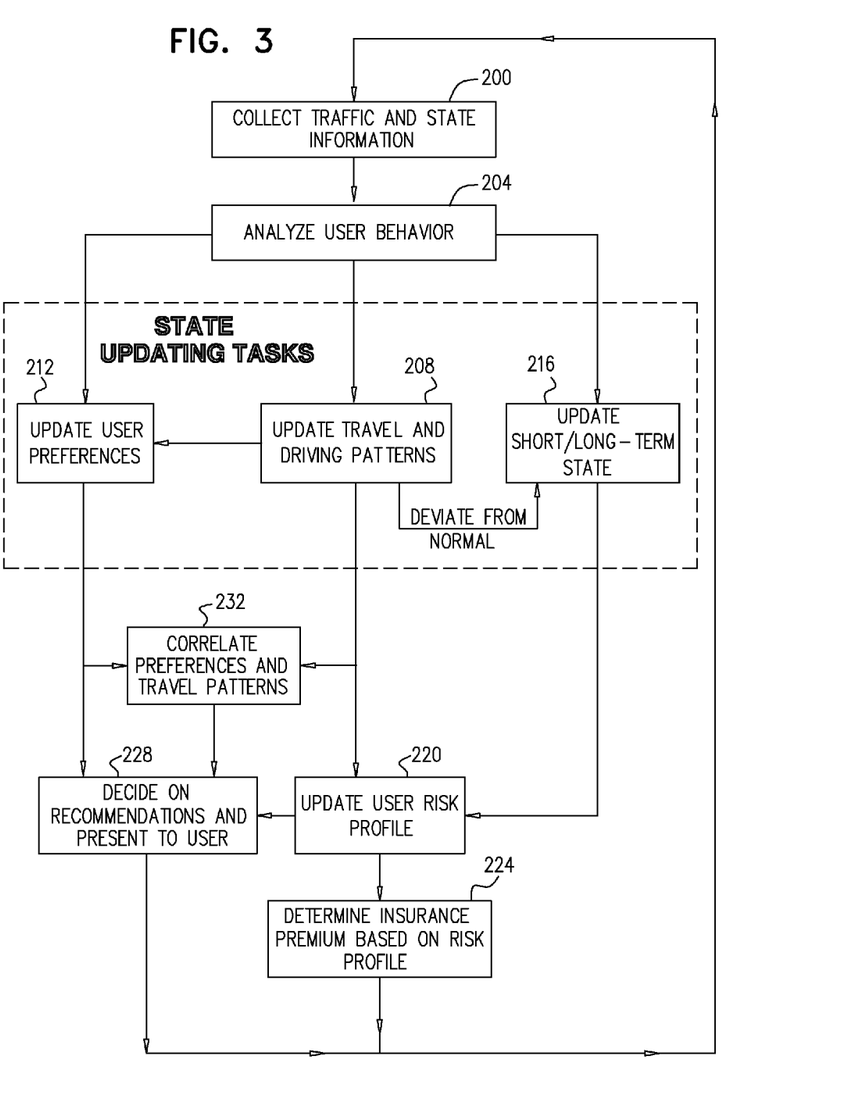
FIG. 3 is a flow chart that schematically illustrates a method for inferring the risk profile of a PDA user from travel patterns, in accordance with an embodiment of the present invention.

FIG. 3 is a flow chart that schematically illustrates a method for inferring the risk profile of a PDA user from travel patterns, in accordance with an embodiment of the present invention. In the example of FIG. 3, the risk profile is used to determine respective insurance premium fees, and to offer the user risk-related recommendations. In general, the method in FIG. 3 is described as carried out by PDA 22 (of user 32). At least some of the method steps, however, can be carried out by server 40, server 44, or by the PDA and the servers combined.

The method begins with PDA 22 collecting traffic and state information at a collection step 200. Sources of information to be collected at step 200 include, for example, location and motion information, and other sensors and feeds as described in FIG. 2 above. The information collected is analyzed at an analysis step 204 to identify various behavioral elements of the user. Based on the user behavior, the user's state is updated as detailed below.

Various aspects of the user state may be updated. PDA 22 updates travel and driving patterns at a travel updating step 208. The PDA updates user preferences based on user behavior and possibly travel patterns at a preference updating step 212. Based on user behavior and travel patterns, PDA 22 updates short-term and long-term state information at a state updating step 216. In case PDA 22 recognizes that the present user activities deviate from expected habitual travel patterns, the PDA updates short-term state information at step 216 accordingly.

Based on the user's travel patterns and other state information, PDA 22 and/or server 40 infers the risk profile of the user at a profile inferring step 220. In the present example, server 40 sends the evaluated risk profile (at step 220 above) to server 44, which determines respective insurance premium fees for user 32 at a premium determination step 224. Following step 224, PDA 22 loops back to step 200 to collect further information.

PDA 22 may use user preferences, travel patterns, short and long-term state information, and/or the risk profile to decide what recommendations to present to the user at a recommendation step 228. Recommendations may include, for example, route directions and mode of transportation to assist the user to optimally plan motion-related activities, or (possibly risk-related) promotional information.

At a correlation step 232, PDA 22 and/or server 40 may seek correlations between the user's travel patterns and preferences and travel patterns and preferences of other users in order to give better focused recommendations at step 228. Following recommendation step 228, PDA 22 loops back to step 200 to collect further information.

Although the embodiments described herein mainly address evaluating the risk profile of traveling PDA users for determining risk-based car insurance premium, the methods and systems described herein can also be used in other applications, such as in determining various other risk-based insurance policies such as life, non-life, dental, directors and officers liability, and the like.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method comprising:
receiving, via a wireless network, in a first server from a personal digital assistant (PDA), data indicative of a travel pattern of a user of the PDA, feed data, and sensor information, the first server including a memory to maintain a user database including information received from a plurality of PDAs including the PDA;
inferring a risk profile of the user of the PDA from the travel pattern, wherein inferring the risk profile comprises assessing a state-of-mind of the user based at least in part on the travel pattern, the feed data and the sensor information; and
outputting the risk profile to an external system coupled to the first server via a second network, the external system including a second memory to store a second user database including a plurality of risk profiles of users of at least some of the plurality of PDAs, so as to enable the external system to provide to the user a commercial offer, via the wireless network, to a user interface of the PDA comprising a display, and at a particular time based on the state-of-mind, the commercial offer based on a risk level which is indicated by the risk profile.

2. The method according to claim 1, wherein the travel pattern comprises a mode of transportation the user of the PDA employs, and wherein inferring the risk profile comprises determining the risk profile based on the mode of transportation.

3. The method according to claim 1, wherein the travel pattern comprises driving hours of the user of the PDA, and wherein inferring the risk profile comprises determining the risk profile based on the driving hours.

4. The method according to claim 1, wherein the travel pattern comprises a driving speed of the user of the PDA while driving a route, and wherein inferring the risk profile comprises comparing the driving speed of the user to a reference speed of the route.

5. The method according to claim 4, further comprising determining the reference speed by performing a comparison between the travel pattern of the user and travel patterns of other users.

6. The method according to claim 1, wherein the commercial offer comprises a promotion for one of an investment or an adventure sport.

7. The method according to claim 6, wherein the promotion is to be selected based at least in part on correlation of a driving pattern of the user with purchasing patterns of a plurality of users.

8. The method according to claim 1, further comprising outputting the risk profile to the external system so as to enable the external system to select the commercial offer based at least in part on the state-of-mind.

9. The method according to claim 8, wherein the commercial offer comprises a promotion including an electronic coupon for a good or service.

10. The method according to claim 1, further comprising updating, using the PDA, a data structure representing a state of the user, the data structure comprising a vector having a plurality of fields, wherein information of only a portion of the plurality of fields are to be sent from the PDA to the first server.

11. An apparatus, comprising:
a user interface comprising a display;
one or more sensors;
a memory to store a vector of values that represent a state of a user of the apparatus;
a communication interface to communicate wirelessly; and
at least one processor, which is configured to collect from the one or more sensors data which is indicative of a travel pattern of the user of the apparatus, and to collect feed data and compute the vector of values, to infer a risk profile of the user of the apparatus, including assessment of a state-of-mind of the user based at least in part on the travel pattern and the feed data, and to output the risk profile to an external system via the communication interface, so as to enable the external system to provide to the user a commercial offer, via the user interface, and at a particular time based on the state-of-mind, the commercial offer based on a risk level which is indicated by the risk profile.

12. The apparatus according to claim 11, wherein the at least one processor is configured to infer the risk profile in part by identification of a mode of transportation the user of the apparatus employs.

13. The apparatus according to claim 11, wherein the at least one processor is configured to infer the risk profile in part by identification of driving hours of the user of the apparatus.

14. The apparatus according to claim 11, wherein the at least one processor is configured to infer the risk profile in part by identification of a driving speed of the user of the apparatus while driving a route, and comparison of the driving speed of the user to a reference speed of the route.

15. The apparatus according to claim 14, wherein the at least one processor is configured to determine the reference speed by performance of a comparison between the travel pattern of the user and travel patterns of other users.

16. The apparatus according to claim 11, wherein the at least one processor is configured to infer the risk profile in part by detection of a deviation from the travel pattern.

17. The apparatus according to claim 11, wherein the external system is to select the commercial offer based at least in part on the state-of-mind.

18. The apparatus according to claim 11, wherein the commercial offer comprises a promotion including an electronic coupon for a good or service.

19. The apparatus according to claim 18, wherein the promotion is to be selected based at least in part on correlation of a driving pattern of the user with purchasing patterns of a plurality of users.

20. The apparatus according to claim 11, wherein the at least one processor is to update a data structure representing the state of the user, the data structure comprising the vector of values having a plurality of fields, wherein information of only a portion of the plurality of fields are to be sent from the apparatus to the external system.

21. A computer software product, comprising a non-transitory computer-readable medium in which program instructions are stored, which instructions, when read by at least one processor, cause the at least one processor to:

collect, in the at least one processor, from one or more sensors data which is indicative of a travel pattern of a user of a PDA which comprises the at least one processor, a memory to store a vector of values that represent a state of a user of the PDA, a communication interface to communicate wirelessly, and a user interface comprising a display;

collect feed data and compute the vector of values, to infer based on the travel pattern a risk profile of the user of the PDA, including assessment of a state-of-mind of the user based at least in part on the travel pattern and the feed data; and output the risk profile via the communication interface to an external system so as to enable the external system to provide to the user via the communication interface a commercial offer, via the user interface of the PDA, and at a particular time based on the state-of-mind, the commercial offer based on a risk level which is indicated by the risk profile.

* * * * *